3,332,662
RETRACTABLE LANDING GEAR FOR TRAILERS
Robert M. Fagan and Walter C. Stout, Seattle, Wash., assignors to Retract-O-Rite Corporation, Seattle, Wash., a corporation of Washington
Filed Nov. 9, 1966, Ser. No. 593,084
7 Claims. (Cl. 254—86)

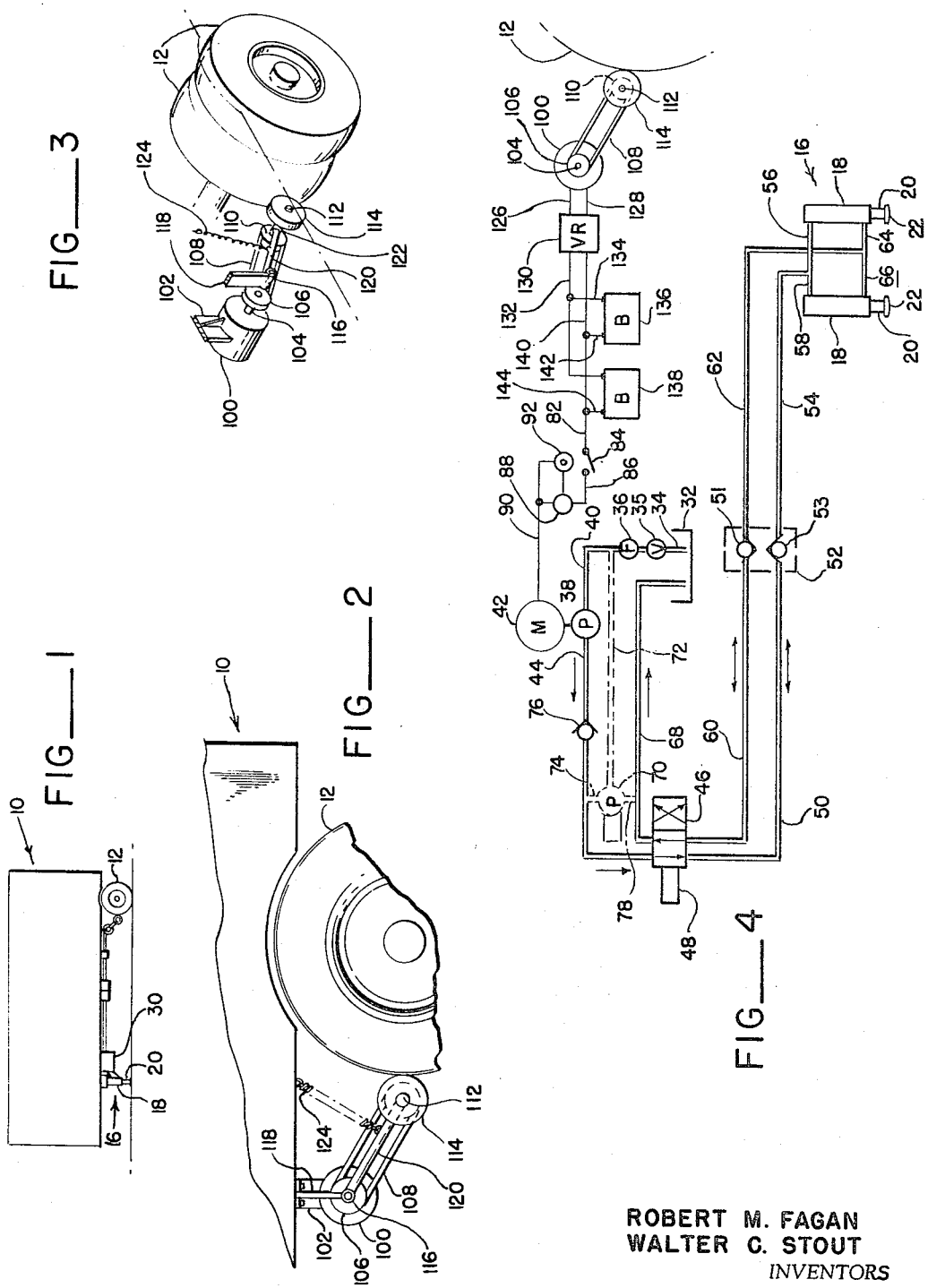
July 25, 1967 — R. M. FAGAN ET AL — 3,332,662
RETRACTABLE LANDING GEAR FOR TRAILERS
Filed Nov. 9, 1966
ROBERT M. FAGAN
WALTER C. STOUT
INVENTORS
ATTORNEYS

United States Patent Office 3,332,662
Patented July 25, 1967

This invention relates to a new and useful invention in the art of retractable landing gears for truck-trailers. More particularly does this invention relate to a new and novel auxiliary supporting gear for trailers which utilizes a self contained electrical-hydraulic system to provide the necessary power for retracting and extending the landing gear. This application is a continuation-in-part of copending U.S. patent application Ser. No. 354,391, filed Mar. 24, 1964, in the name of Robert M. Fagan and entitled, "Retractable Landing Gear for Trailers."

The trucking industry has long been plagued by a proliferation of costly, complicated, easily damaged and undependable landing gears or auxiliary support units, for the front ends of trailers. Most all of the prior art devices have been mechanical and manually operated. Their general unacceptability has been due to numerous parts composed of linkages, gears, jack screws and other components which restrict the ability of the particular landing gear to perform its intended function. One great drawback of most of the prior art units has been their manual operation. A single operator in many instances is not able to generate the power on the manual device necessary either to extend or to retract. This is particularly true in cold weather where after long trips landing gears may be completely encased in ice. Manual landing gears under icy conditions do not have the leverage necessary to permit the operator to apply hand force and still break the landing gear loose from the ice. Some of the prior art devices employ slide-type linkages which have the disadvantage of binding and of bending easily so that they incur frequent repairs. Prior art devices are also notorious for the fact that they have only two positions, namely fully extended and fully retracted. Thus, there is no ability within the known types of landing gears for height adjustment. Furthermore, all of the known devices have the leg on one side of the trailer interconnected with the landing gear on the other side of the trailer so that the landing gear unit as a whole must move up and down together always at the same height. On the occasions when there are slopes involved one landing gear will contact the ground before the other. Thus, the landing gear which fails to come in contact with the ground must be cribbed so that both landing gears are supporting the trailer. Many of the known devices do not achieve a desirable roadway clearance. Some in their retracted position will clear the roadway by no more than 6 inches. Others are slightly higher. However, uneven terrain as is frequently found in trailer parking and loading zones, subjects the landing gears to severe shocks and impacts necessitating all too frequent repairs and immobilization of the trailer. Another of the inherent disadvantages of prior art devices is that they lack any ability for height adjustment between fully extended and fully retracted positions. Manually operated landing gears cannot be used to raise the trailer off the tractor fifth wheel so that the tractor may be driven away. This is particularly true when the trailers may be partly or completely loaded.

The landing gear of the instant invention overcomes the disadvantages of the hitherto known devices by providing a pair of downwardly extending, high pressure, hydraulic cylinders which are rigidly connected to the underframe of the trailer. A compact and unique control unit including an oil reservoir, a high pressure motor and pump unit, valving, and high pressure hydraulic lines actuate the landing gear cylinders. The piston rod of each cylinder is provided at its outer end with a heavy pad or wheel, as desired. The system is arranged so that should one landing gear leg come in contact with the ground before the other it will stop while the other continues to extend until it also contacts the ground. In this landing gear system operating pressure can if desired be generated off the tractor electrical system. Preferably and more commensurately with the needs of industry, the hydraulic landing gear system is actuated by an independent electrical system built on or into the trailer itself. Two heavy duty batteries supply electrical energy to drive the hydraulic pump motor. The batteries in turn are maintained at strength by a recharging system also attached to the trailer. Thus, the landing gear can be operated independently of the tractor.

Accordingly, it is a feature of this invention to provide a landing gear for trailers which is simple in design, rugged in construction, and economical to produce.

Another feature of this invention is to provide a landing gear for trailers which has complete adaptability and adjustability in its ability to completely support the trailer at any height between its maximum and minimum positions.

Still another feature of this invention is to provide a landing gear for trailers which eliminates demanding manual effort in the extending and retracting of the gear.

Yet another feature of this invention is to provide a landing gear for trailers in which the two legs of the landing gear are self-equalizing in adjusting to the variations and slopes in ground surfaces.

A further feature of this invention is to provide a landing gear for trailers which may be completely operated by simple hand controls thus eliminating all physical effort.

A still further feature of this invention is to provide a landing gear for trailers which can if necessary lift one end of a loaded trailer and the rear of a tractor completely off the ground for such things as changing tires, axle repairing, or for installing and removing chains.

Yet a further feature of this invention is to provide a landing gear for trailers which has maximum retraction and roadway clearance to eliminate the problem of damaging repairs because of road shocks and impacts.

An even further feature of this invention is to provide a landing gear for trailers which can be adapted to any existing and to any new trailer body.

Yet another feature of this invention is to provide a landing gear for trailers which has its own unique electrical generating system and is therefore independent of the tractor.

These and other objects, advantages, and features will become apparent in the details of construction and operation as more fully hereinafter described and claimed. Reference will be had to the accompanying drawings, forming a part hereof, wherein like numerals refer to like parts throughout, and in which:

FIGURE 1 is a side elevational view of a trailer provided with the landing gear of this invention and showing generally the landing gear and location of its associated controls;

FIGURE 2 is a partial elevational view of the trailer of FIGURE 1 showing in more detail the drive wheel for the recharging system as it would engage a trailer tire;

FIGURE 3 is a partial view in perspective showing in greater detail the structure of the recharging mechanism of FIGURE 2; and FIGURE 4 is a diagrammatic view of the elements, including electrical and hydraulic systems by which the landing gear legs are actuated.

Referring now to the drawings it will be seen that the trailer generally designated by the number 10 is a representative of the box type cargo and freight trailers used widely in commerce. As those skilled in the art will appreciate most trailers are designed so that the rear wheels are permanently attached to the trailer while the front end of the trailer has a fifth wheel connection permitting it to be attached to converter dollies or tractors. As with conventional trailers, the trailers will be provided near the front end thereof with an auxiliary landing gear for supporting the trailer while it is disconnected from a tractor, or from a truck and trailer assembly.

The landing gear, generally designated by the number 16, is comprised of two legs each of which is made up of a downwardly extending, double acting hydraulic cylinder 18 having a piston rod 20 and a pad or wheel 22 at the outer end thereof. It will be appreciated that the cylinders are high pressure types designed for operating pressures as high as 1500 p.s.i. The upper end of each cylinder 18 is firmly secured to the trailer and braced. Thus, cylinders 18 are rigidly and securely anchored in position to the undercarriage or frame of the trailer body.

A control box 30 is located adjacent a leg of the landing gear on one side of the trailer. FIGURE 4 shows in greater detail the components of the landing gear control system. An oil reservoir 32 is provided with a sufficient quantity of hydraulic fluid to actuate the cylinders 18. A line 34 permits fluid to pass out of the reservoir through valve 35, a filter 36 and thence to pump 38 by way of line 40. An electric motor 42 operating off the electrical system, is connected to pump 38 to provide the driving power for said pump. The pressure or discharge side of the pump is connected to line 44 which is routed to selector valve 46. Selector valve 46 by action of manual lever 48 permits the fluid from pump 38 to be directed to the appropriate end of the cylinders for retracting or extending the legs. When it is desired to extend the legs fluid is directed from valve 46, through line 50, through a dual pilot operated check valve 52, and then through line 54 to branch lines 56 and 58. Said branch lines 56 and 58 are connected to the upper end of the cylinders for driving the piston and piston rod 20 outwardly.

When it is desired to retract the legs of the landing gear the selector valve 46 by virtue of selector lever 48 is turned to the retract position and fluid is directed under pressure from the valve through line 60, through the dual check valve 52, line 62 and branch lines 56 and 66 to the lower end of the cylinders 18. Thus, the pistons are driven upwardly and the legs retracted. Fluid from the unpressurized end of the cylinder is reversed or redirected through the branch lines 56 and 58 and thence line 54, back through the check valve 52, through valve 46, and out of valve 46 through line 68 back to the reservoir 32. Under normal operation a check valve will allow flow of fluid only in one direction and hence automatically closes to reverse flow.

In the case of valve 52 the two sections 51 and 53 of said valve are interconnected so that when pressure is directed either through line 50 or line 60 the check valve is opened on that particular side allowing the pressurized fluid to flow to the cylinders. At the same time fluid must be returned from the other end of the cylinder through check valve 52, through the selector valve 46 and thence to thes reservoir. Such is accomplished by interconnecting the check valve portions 51 and 53 so that pressure in lines 50 and 54, to extend the legs, opens the check valve portion 53 in lines 60 and 62 permitting the return of fluid to the valve and the reservoir. In no event however will the check valve 52 permit the reverse flow of fluid through valve portion 51. In like manner when pressure is applied through line 60 and 62 to retract the legs, check valve portion 53 is opened to allow reverse fluid flow from the upper end of the cylinders.

Motor 42, while it may be energized by power from the tractor electrical system, is preferably and more desirably driven by an electrical system mounted on the trailer so that it is completely independent of the tractor. It this way, inter-lining of trailers equipped with this invention may be accomplished without the necessity for making any electrical connections between a new tractor and a trailer. For instance, if a trailer with the invention is taken to a particular point and the tractor removed and a different tractor substituted to move the trailer to the next point, there need be no concern that the new tractor will have to have the necessary electrical connections in order to permit operation of the landing gear system. Hence, it has been found that the needs of the trucking industry are far better answered with a trailer-contained electrical system as part of the hydraulic landing gear controls. To this end a dechargeable battery electrical system is provided. At the rear end of trailer 10 and forwardly of wheels 12, preferably the inside dual, an alternator 100 is suitably attached to the undercarriage of the trailer by a bracket or plate 102. Alternator 100 has shaft 104 on which is mounted pulley 106. Pulley 106 is driven by belt 108 which is also supported at its other end by pulley 110. Pulley 110 in turn is mounted on shaft 112 upon which is also mounted at the other end thereof a drive wheel 114. Shaft 112, pulley 110 and drive wheel 114 are mounted for swinging or pivotal movement about a hinge 116 supported by a bracket or some other means 118. It will be noted that 116 is generally coaxial with the axes of the alternator and upper belt pulley 106. A supporting arm 120 angles downwardly and at the lower end thereof is located a cross arm or shaft supporting section 122 which receives shaft 112 to which are attached lower belt pulley 110 and the drive wheel 114. A spring 124 may be incorporated to bias the swinging arm around hinge point 116 so that drive wheel 114 will engage preferably the inside dual of wheels 12.

It will be appreciated that this recharging structure is mounted up under the frame of the trailer so that as a practical matter it may not be located so as to engage wheel 12 as low as shown. Obviously, the hinged arm with the shaft supporting section thereon should swing coaxially with the upper belt pulley and alternator shaft so that movement of the hinged arm does not account for differences in slack in belt 108 as by either tightening the belt or by permitting it to become too loose. Thus, the drive wheel 114 is rotated by the trailer tire or wheel 12. The drive wheel 114 through belt 108 drives the alternator at speeds ranging from approximately 2,000 to 10,000 r.p.m. Alternator 100 is connected by electrical lines 126 and 128 to voltage regulator 130. The voltage regulator in turn is connected by lines 132 and 134 to one side of batteries 136 and 138. The circuit is completed from the voltage regulator to the batteries by lines 140, 142 and 144. It will be noted that line 140 from the voltage regulator. besides being connected to the batteries, also connects to electrical input line 82 which has a main on and off or disconnect switch 84. Power is supplied from the batteries through line 82, switch 84, and line 86 to a solenoid switch 88 and thence through line 90 to motor 42. A push button control switch 92 for the motor and pump is provided so that the operator has finger tip control of the electrical and hydraulic system. Push button 92 operates the main motor switch 88.

It may be found desirable to include as optical equipment a manually operated pump, although it is not likely that a manual system will be needed in view of the fact that the trailer's electrical system is in effect self contained. The manual system, shown in dash-dot lines, would, if included, comprise an auxiliary hand operated or manual pump 70. Pump 70 will receive hydraulic fluid from the reservoir through line 40 and line 72. The output or pressure side of pump 70 will direct fluid through line 74 into line 44. For this reason it is necessary to have check valve 76 in line 44 in order to prevent the fluid from pump 70 flowing in the wrong direction. An excess volume of hydraulic fluid to pump 70 may be rerouted back to line 68 and oil reservoir 32 via line 78. Control box 30 is designed to receive the batteries as well as other components of the system. Alternator 100 and voltage regulator 130 will be located at the rear of the trailer near wheels 12. It will also be appreciated that additional landing gear legs may be operated off the same electrical-hydraulic system incorporating a second selector valve.

The foregoing is considered as illustrative only of the principles of this invention. Numerous modifications and changes will occur to those skilled in the art, and hence it is not desired to limit the invention to the exact construction and operation as shown and described. Accordingly, all suitable modifications and equivalents may be resorted to, falling within this scope of the invention.

What is claimed is:

1. Retractable landing gear and gear control system for trailers, comprising: (a) a pair of downwardly extending, spaced apart, double acting, hydraulic cylinders rigidly and individually mounted at their rear ends to the under-frame of a trailer and securely braced as mounted, said cylinders having piston rods with ground contact elements at the outer ends thereof, (b) a first hydrauilc pressure line connected to the upper ends of said cylinders for extending said piston rods, (c) a second hydraulic pressure line connected to the lower ends of said cylinders for retracting said piston rods, (d) a first valve connected to said first and second pressure lines for selectively directing hydraulic fluid under pressure thereto, (e) a second valve connected to said first and second lines between said cylinders and said first valve, said second valve permitting return of fluid to said first valve through one of said lines when fluid under pressure is being directed to said cylinders through the other of said lines, (f) motor operated pump means connected to said first valve for directing hydraulic fluid under pressure thereto, (g) a reservoir connected to said first valve to receive fluid returning to said first valve from said cylinders, and a line leading from said reservoir to said pump means, and (h) a trailer-contained electrical system for energizing said motor, said electrical system including an alternator, means mounting said alternator for engaging a wheel of said trailer to be driven thereby, a voltage regulator connected to said alternator and battery means connected to said voltage regulator so that said battery means may be recharged by said alternator and voltage regulator.

2. The landing gear and gear control system of claim 1 and in which electrical switch means are disposed between said battery means and said motor for selectively actuating said motor to drive said pump.

3. The landing gear and gear control system of claim 1 and in which said alternator is driven by pulley means attached to the shaft thereof and wherein said pulley is in turn driven by a drive wheel means resiliently biased against the wheels of said trailer.

4. Retractable landing gear and gear control system for trailers, comprising: (a) a pair of downwardly extending, spaced apart, double acting, hydraulic cylinders rigidly and individually mounted at their rear ends to the under-frame of a trailer and securely braced as mounted, said cylinders having piston rods with ground contact elements at the outer ends thereof, (b) a first hydraulic pressure line connected by branch lines to the upper ends of said cylinders for extending said piston rods, (c) a second hydraulic pressure line connected by branch lines to the lower ends of said cylinders for retracting said piston rods, (d) a first valve connected to said first and second pressure lines for selectively directing hydraulic fluid under pressure thereto, (e) a second valve connected to said first and second lines between said cylinders and said first valve, said second valve permitting return of fluid therethrough to said first valve through one of said lines when fluid under pressure is being directed therethrough to said cylinders through the other of said lines, said first valve also permitting return of fluid therethrough, (f) motor-operated pump means connected to said first valve for directing hydraulic fluid under pressure thereto, (g) a reservoir connected to said first valve to receive fluid returning to said first valve from said cylinders, and a line including filter means leading from said reservoir to said pump means, and (h) a trailer-contained electrical system for energizing said motor, said electrical system including a recharging alternator, means mounting said alternator for engaging a wheel of said trailer to be driven thereby, a voltage regulator connected to said alternator and battery means connected to said voltage regulator, said battery means being connected to said motor through switch means to permit selective control and actuation of said hydraulic systems by said electrical systems.

5. The landing gear and gear control system of claim 4 and in which electrical switch means are disposed between said battery means and said motor for selectively actuating said motor to drive said pump.

6. The landing gear and gear control system of claim 4 and in which said alternator is driven by pulley means attached to the shaft thereof and wherein said pulley is in turn driven by a drive wheel means resiliently biased against the wheels of said trailer.

7. The landing gear and gear control system of claim 4 and in which said alternator is fixedly supported on said trailer and driven by a first pulley means coaxially attached thereto, said first pulley being interconnected by continuous belt means to a second pulley located in generally coplanar spaced relation to said first pulley, said second pulley in turn being coaxially connected to a drive wheel means pivotally supported and resiliently biased against a wheel of said trailer.

References Cited
UNITED STATES PATENTS

| | | | |
|---|---|---|---|
| 1,616,841 | 2/1927 | Beebe | 60—52 |
| 1,955,154 | 4/1934 | Temple | 60—52 |
| 2,142,216 | 1/1939 | Seyferth | 254—86 X |
| 2,574,416 | 11/1951 | Rose | 60—52 X |
| 2,837,312 | 6/1958 | Trache | 254—86 |

OTHELL M. SIMPSON, *Primary Examiner.*